United States Patent
Roctus et al.

(10) Patent No.: US 9,415,612 B2
(45) Date of Patent: Aug. 16, 2016

(54) PRINTING APPARATUS

(71) Applicant: DYMO, Sint-Niklaas (BE)

(72) Inventors: Jerry Roctus, Clinge (NL); Kris Vandermeulen, Bornem (BE)

(73) Assignee: DYMO, Sint-Niklaas (BE)

( * ) Notice: Subject to any disclaimer, the term of this patent is extended or adjusted under 35 U.S.C. 154(b) by 0 days.

(21) Appl. No.: 14/435,760

(22) PCT Filed: Oct. 3, 2013

(86) PCT No.: PCT/EP2013/070652
§ 371 (c)(1),
(2) Date: Apr. 15, 2015

(87) PCT Pub. No.: WO2014/060219
PCT Pub. Date: Apr. 24, 2014

(65) Prior Publication Data
US 2015/0266319 A1    Sep. 24, 2015

(30) Foreign Application Priority Data
Oct. 15, 2012 (GB) .................................. 1218459.4

(51) Int. Cl.
| | | |
|---|---|---|
| *B41J 11/00* | (2006.01) | |
| *B41J 11/70* | (2006.01) | |
| *B26D 1/08* | (2006.01) | |
| *B41J 3/407* | (2006.01) | |
| *G06K 15/02* | (2006.01) | |
| *B26D 5/14* | (2006.01) | |
| *B26D 5/08* | (2006.01) | |
| *B26D 7/00* | (2006.01) | |

(52) U.S. Cl.
CPC ................. *B41J 11/70* (2013.01); *B26D 1/085* (2013.01); *B41J 3/4075* (2013.01); *B41J 11/703* (2013.01); *G06K 15/024* (2013.01); *B26D 5/08* (2013.01); *B26D 5/14* (2013.01); *B26D 2007/005* (2013.01)

(58) Field of Classification Search
CPC .......... B41J 11/02; B41J 11/04; B41J 11/053; B41J 11/057; B41J 11/66; B41J 11/663; B41J 11/666; B41J 11/706; B41J 13/30; B41J 11/06; B41J 11/13
USPC .......... 347/220, 221, 222, 197, 198, 104, 171; 400/621, 621.1, 633, 636; 83/162, 438
See application file for complete search history.

(56) References Cited

U.S. PATENT DOCUMENTS

| | | |
|---|---|---|
| 6,113,293 A | 9/2000 | Schanke et al. |
| 2005/0192910 A1 | 9/2005 | Auberger et al. |
| 2010/0018376 A1 | 1/2010 | Adams et al. |
| 2010/0188470 A1 | 7/2010 | Tsuchiya et al. |
| 2011/0155324 A1 | 6/2011 | Tai et al. |

FOREIGN PATENT DOCUMENTS

| | | |
|---|---|---|
| CN | 102189830 A | 9/2011 |
| JP | 2006334679 A | 12/2006 |
| WO | WO-2011/116515 A1 | 9/2011 |

OTHER PUBLICATIONS

Search Report and Written Opinion in International Application No. PCT/EP2013/070652 dated Jan. 15, 2014.
Search Report in GB Application No. 1218459.4 dated Apr. 9, 2014, 4 pages.

*Primary Examiner* — Kristal Feggins
(74) *Attorney, Agent, or Firm* — Marshall, Gerstein & Borun LLP

(57) ABSTRACT

A printing apparatus (301) comprising: a housing; a printing mechanism; a receiving bay for receiving a supply of image receiving medium; a cutter module (350) removably attached in said housing for cutting said image receiving medium, said cutter module comprising a movable blade and an actuator for actuating said movable blade; wherein said housing comprises an aperture (370), said cutter module being at least partially received in said aperture, and being removable via said aperture.

23 Claims, 7 Drawing Sheets

PRINTING APPARATUS

The present invention relates to a printing apparatus. More particularly the present invention relates to a printing apparatus comprising a cutter.

Known label printing apparatuses are disclosed in EP-A-322918 and EP-A-322919 (Brother Kogyo Kabushiki Kaisha) and EP-A-267890 (Varitronic). The label printing apparatuses each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The apparatuses of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set. Some apparatuses of the type described may also comprise a cutting mechanism for cutting the tape after a printing operation.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

In a first aspect there is provided a printing apparatus comprising: a housing; a printing mechanism; a receiving bay for receiving a supply of image receiving medium; a cutter module removably attached in said housing for cutting said image receiving medium, said cutter module comprising a movable blade and an actuator for actuating said movable blade; wherein said housing comprises an aperture, said cutter module being at least partially received in said aperture, and being removable via said aperture.

Preferably said actuator comprises a cutter button.

Preferably said actuator projects outwardly from said printing apparatus when in a rest position.

Preferably said cutter module is slidably receivable in said housing via said aperture.

Preferably said cutter module comprises at least one fixed blade.

Preferably said housing comprises a locking mechanism for locking said cutter module in said printing apparatus.

Preferably said locking mechanism comprises a release mechanism for unlocking said cutter module from said housing.

Preferably said release mechanism is accessible via a cover of said printing apparatus.

Preferably said cutter module is a snap-fit in said printing apparatus.

Preferably said receiving bay comprises a drive spool for driving said image receiving medium, wherein said cutter module is removable from said aperture in a direction perpendicular to an axis of rotation of said drive spool.

Preferably said actuator has a cross-sectional area, and wherein the other components of the cutter module define an outer profile which can be accommodated within said cross-sectional area.

Preferably said cross-sectional area is in a plane that is perpendicular to a direction in which the actuator is configured to be actuated.

In a second aspect there is provided a cutter module for a label printing apparatus comprising: a body portion; a fixed blade; a movable blade; wherein said cutter module is configured to be at least partially receivable, and removable, from an aperture in a label printing apparatus.

Preferably said body portion comprises a connector for connecting to an actuator for actuating said movable blade; said actuator having a cross-sectional area, and wherein the body portion, fixed blade and movable blade define an outer profile which can be accommodated within said cross-sectional area.

Preferably said cross-sectional area is in a plane that is perpendicular to a direction in which the actuator is configured to be actuated.

In a third aspect there is provided a cutter module for a label printing apparatus comprising: a body portion; a fixed blade; a movable blade; and an actuator; wherein said actuator is connected to said movable blade with a linkage arrangement, and wherein movement of said actuator in a first direction causes a corresponding movement of the movable blade in a second direction, said second direction being opposite to said first direction.

Preferably said linkage arrangement comprises a lever arranged to rotate about a pivot point.

Preferably actuation of said actuator drives said movable blade towards said actuator.

Preferably said actuator is biased away from said movable blade.

According to a fourth aspect there is provided a printing device comprising a cutter module comprising a body portion; a fixed blade; a movable blade; and an actuator; wherein said actuator is connected to said movable blade with a linkage arrangement, and wherein movement of said actuator in a first direction causes a corresponding movement of the movable blade in a second direction, said second direction being opposite to said first direction.

According to a fifth aspect there is provided a printing apparatus comprising: a housing; printing means; receiving means for receiving a supply of image receiving medium; cutting means removably attached in said housing for cutting said image receiving medium, said cutting means comprising movable blade means and actuation means for actuating said movable blade means; wherein said housing comprises an aperture, said cutting means being at least partially received in said aperture, and being removable via said aperture.

According to a sixth aspect there is provided cutting means for a label printing apparatus comprising: a body portion; fixed blade means; movable blade means; wherein said cutting means is configured to be at least partially receivable, and removable, from an aperture in a label printing apparatus.

According to a seventh aspect there is provided cutting means for a label printing apparatus comprising: a body portion; fixed blade means; movable blade means; and actuation means; wherein said actuation means is connected to said movable blade means with linkage means, and wherein movement of said actuation means in a first direction causes a corresponding movement of the movable blade in a second direction, said second direction being opposite to said first direction.

According to an eighth aspect there is provided a printing device comprising cutting means comprising: a body portion; fixed blade means; movable blade means; and actuation means; wherein said actuation means is connected to said movable blade means with linkage means, and wherein movement of said actuation means in a first direction causes a corresponding movement of the movable blade in a second direction, said second direction being opposite to said first direction.

Some embodiments will now be described by way of example only with reference to the accompanying Figures in which.

Figure 1:
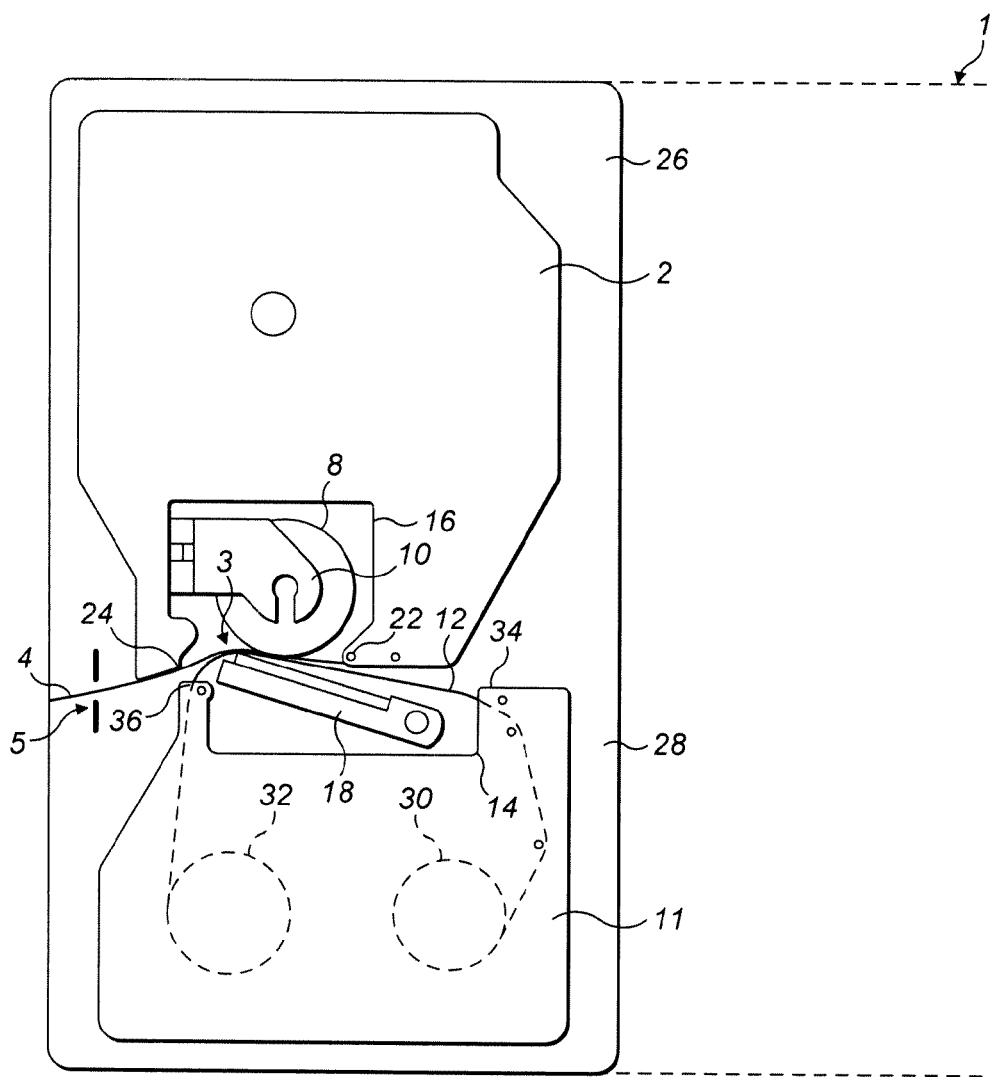
FIG. 1 shows certain parts of one type of label printer.

FIG. 1 shows in plan view certain parts of a first label printer which has two cassettes arranged therein. Typically, this label printer 1 is powered by batteries at least part of the time. Alternatively the label printer may be mains powered.

The first cassette 2 is located in a first cassette receiving portion 26 and contains a supply of image receiving tape 4 which passes through a print zone 3 of the label printer 1 to an outlet 5 of the label printer 1. The image receiving tape 4 comprises an upper layer for receiving a printed image on its upper surface and has its other surface coated with an adhesive layer to which is secured a releasable backing layer. The first cassette 2 has a recess for accommodating a platen 8 of the label printer 1, and guide portions 22 and 24 for guiding the tape through a print zone 3. The platen 8 is mounted for rotation within a case moulding 10. Alternatively the platen could be mounted for rotation on a pin.

The second cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has recess 14 for receiving a print head 18 of the label printer 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8 in an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed.

A DC motor drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

In an alternative embodiment (not shown) the label printer 1 may comprise a one-cassette system. In such a system the cassette comprises a supply of thermally activatable image receiving medium which reacts when heated by the thermal printhead to provide a printed image. In such a system there is therefore no need for a separate ink-ribbon cassette.

Figure 2:
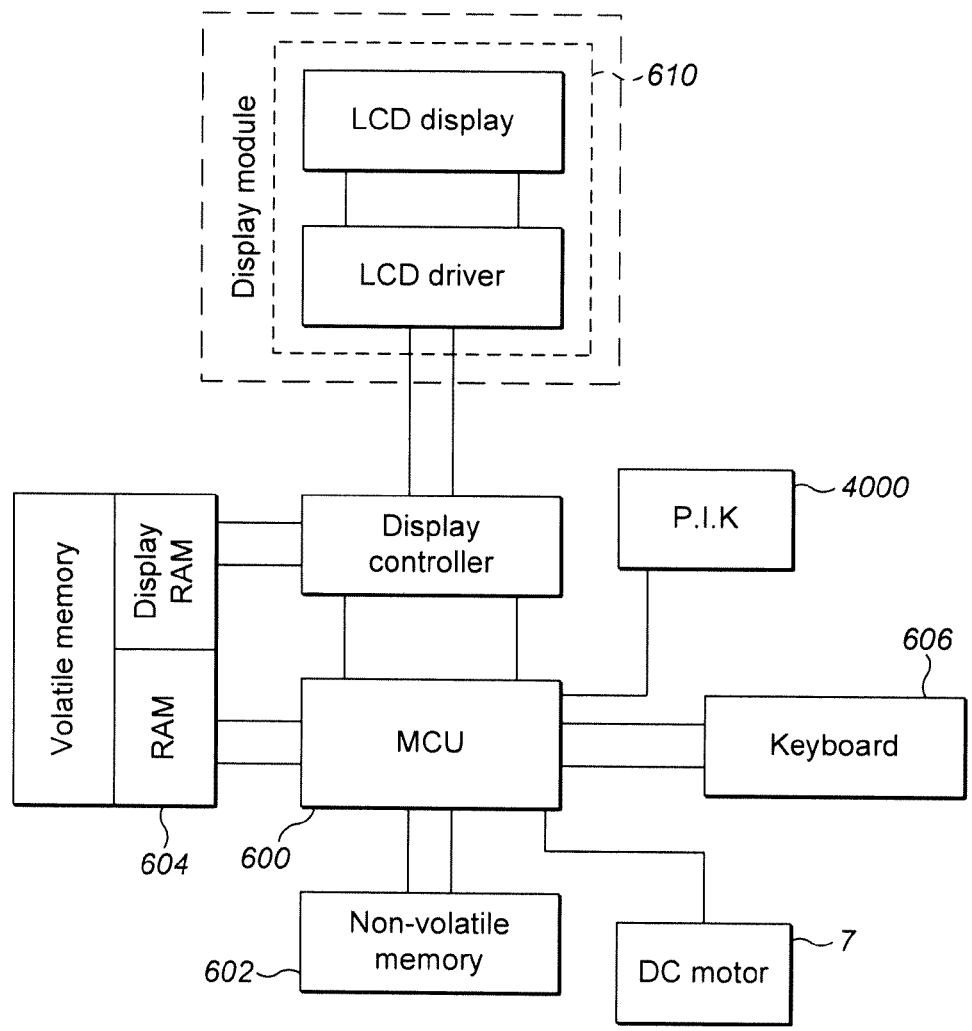
FIG. 2 is a schematic view of basic circuitry of the label printer.

Basic circuitry for controlling the label printer 1 of FIG. 1 is shown in FIG. 2. There is a controller or "control means" (such as a micro controller unit (MCU) or processor) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a hardware keyboard 608 including any one or more of plural keys, a mouse, a digital pen or tracker ball, or any other means for enabling a user to send commands to the controller 600. The MCU 600 outputs data to drive the display 610 to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen.

It should also be understood that where the label printer is connected to an external apparatus such as a PC, then the PC also contains similar components such as at least one memory and at least one processor to enable the PC to carry out the operations of creating a label to be printed. Such a PC will also be connected to a display means such as a monitor.

Figure 3:
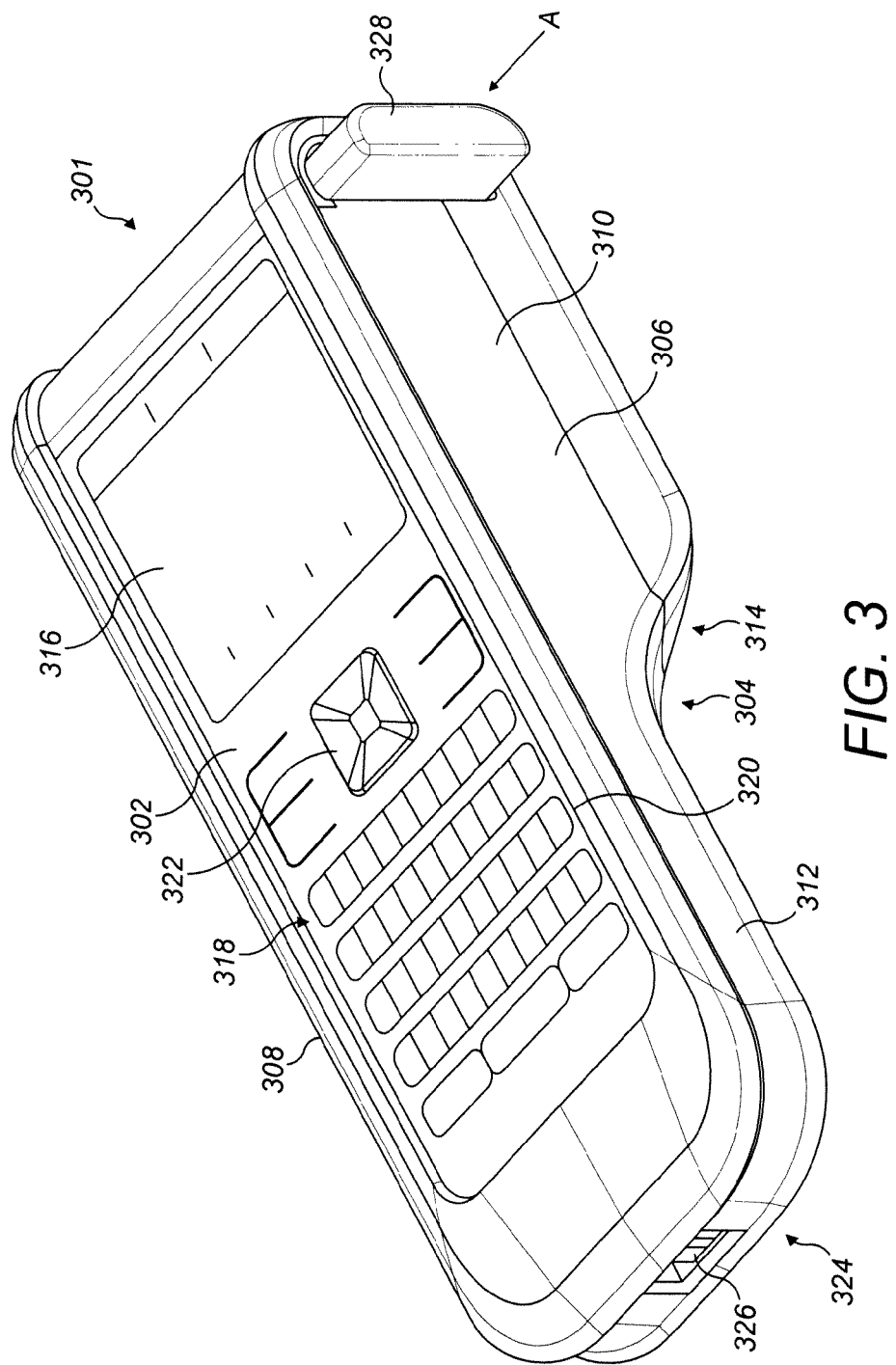
FIG. 3 is a perspective view of a label printer.

FIG. 3 is an isometric view of a label printer 301 according to one embodiment. It should be appreciated that the label printer 301 may comprise any combination of the features also shown in FIGS. 1 and 2. The label printer 301 comprises a top 302, a base 304, and sides 306 and 308 extending from the base to the top. The sides 306 and 308 comprise a first portion 310 which tapers down to a thinner portion 312 via curve portion 314. This shape makes the printer 301 easy to hold and also reduces the overall size and weight of the label printer, making it easier to carry.

The top 302 of the label printer comprises an LCD screen 316 which acts as a graphical display for the user. Via this graphical display the user can view and edit labels to be printed, and can also be presented with messages and warnings. In some embodiments the graphical display 316 may be a touch screen.

The top 302 of the label printer 301 also comprises a keyboard area 318. The keyboard area 318 comprises entry keys 320 which enable a user to enter text, symbols and numbers in the preparation of a label. As these numbers and/or symbols and/or letters are entered they will be displayed on the graphical display 316. The keyboard area 318 also comprises a button 322 which enables a user to control the position of a cursor on the graphical display 316. This enables a user to navigate around a label during its preparation.

A bottom end 324 of the label printer comprises a slot 326. This slot may be used for attachment of a wrist strap.

The label printer 301 also comprises an actuator 328 for actuating a cutting mechanism of the label printer, for cutting the image receiving tape after a printing operation. The actuator 328 may also be referred to as a cutter button. The actuator 328 is actuated by a user pressing it in the direction of arrow A. The actuator 328 is spring loaded such that when the force in the direction of arrow A is removed, the actuator returns to its rest position. The actuator and the cutter mechanism are described in more detail below.

Figure 4:
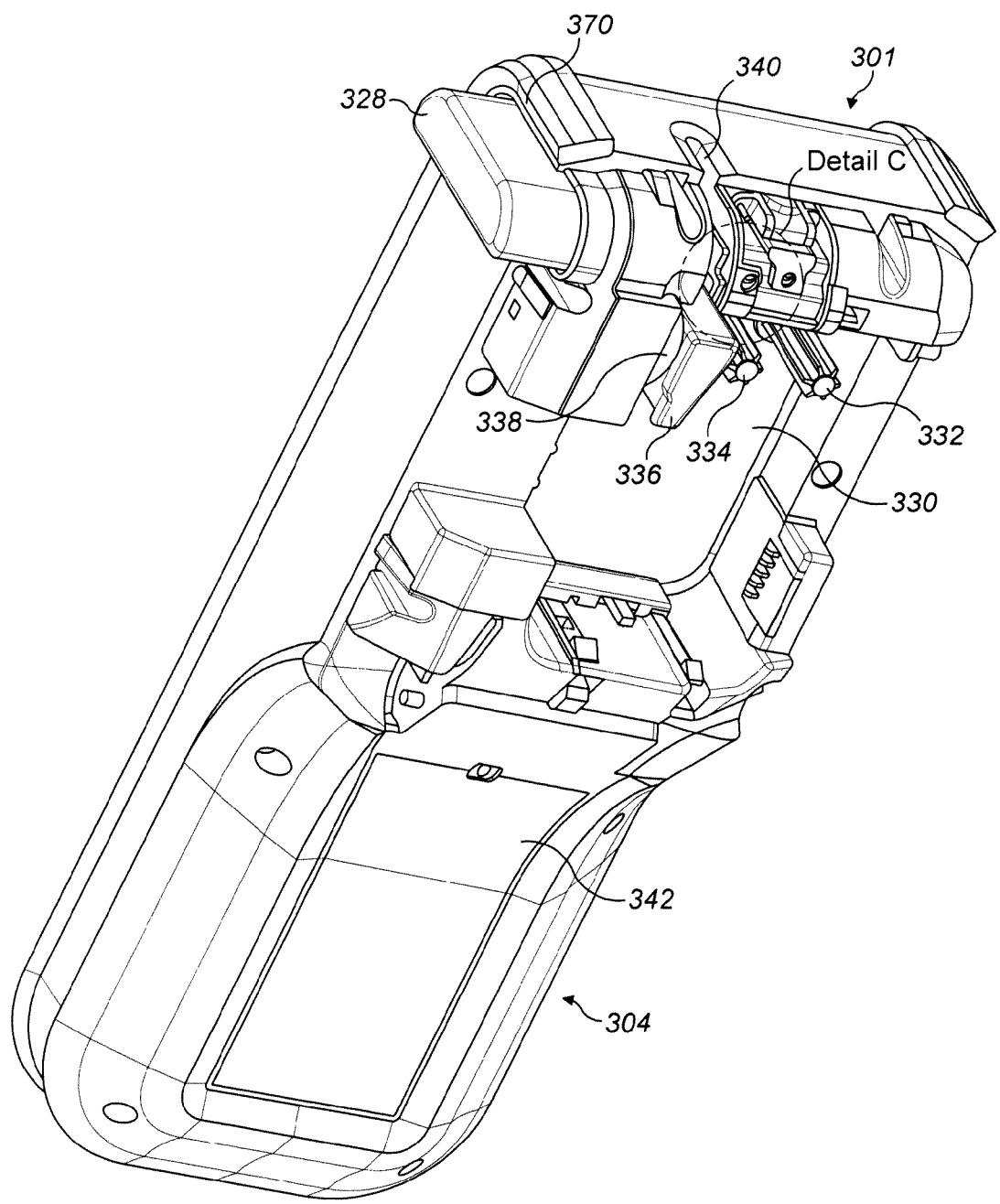
FIG. 4 is a perspective view of the underside of the label printer of FIG. 3.

FIG. 4 is an isometric view of the base 304 of the label printer 301. In this view a cover on the base of the cassette has been removed to reveal cassette receiving bay 330. The cassette receiving bay 330 is configured to receive a cassette containing image receiving medium to be printed. The cassette may also contain a supply of ink ribbon. Drive spools 332 and 334 extend vertically in cassette receiving bay 330. The drive spools 332 and 334 engage with corresponding spools in an inserted cassette so as to drive the image receiving medium through the cassette and/or to drive a take up spool for taking up used ink ribbon. The cassette receiving bay 330 also comprises a print head holder 336 and a platen 338 together forming a print zone for printing onto the image receiving medium. Following a printing operation the image receiving tape exits the label printer 301 via outlet 340. Actuator 328 is also visible in this Figure.

The base 304 also comprises a cover 342. This cover can be removed to reveal a battery pack.

Figure 5:
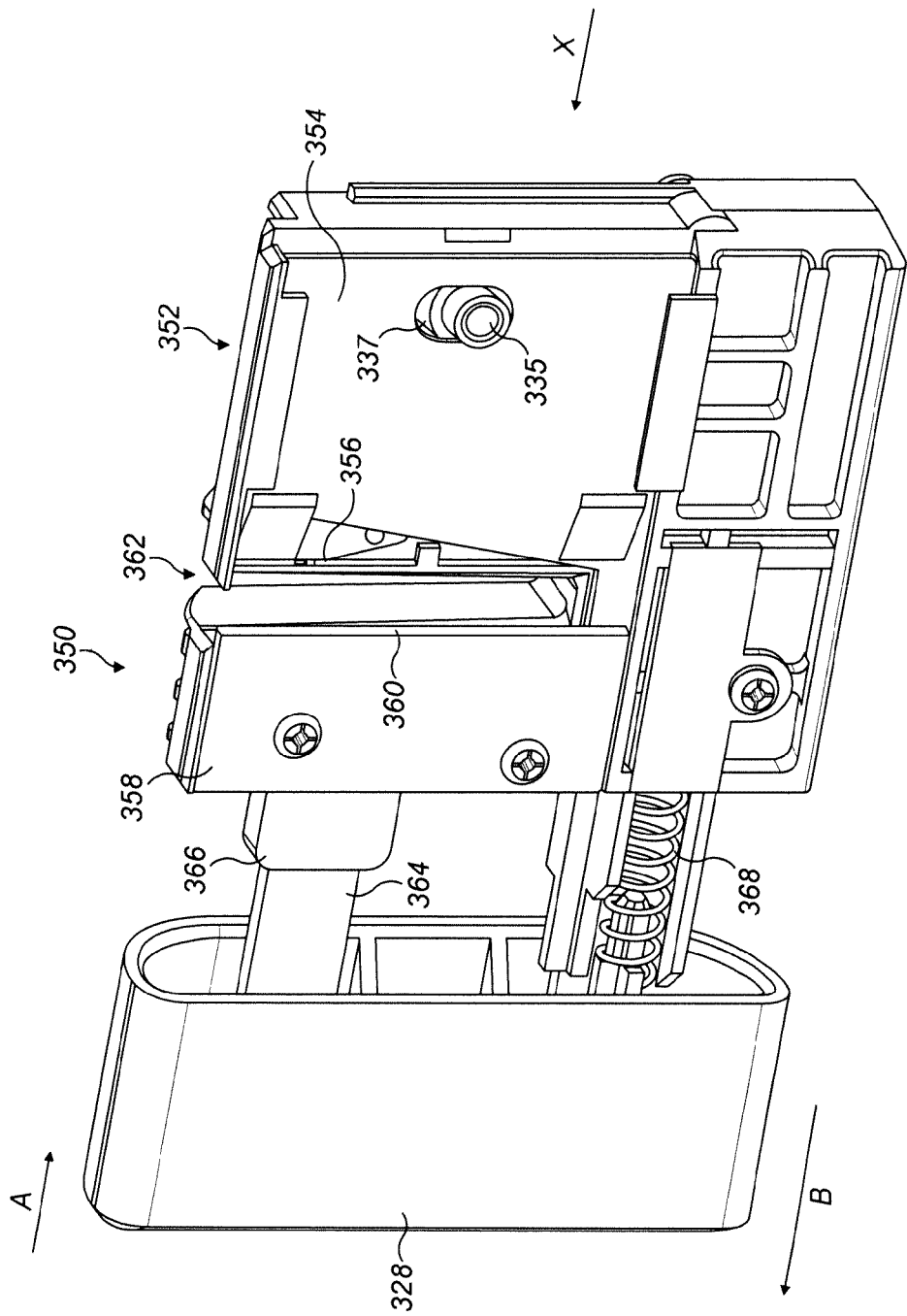
FIG. 5 is a perspective view of a cutter module.

As shown in FIG. 5 the actuator 328 is part of a cutter module 350. The cutter module comprises a main body portion 352, to which is attached a fixed blade 358. The fixed blade 358 comprises a knife portion 360. The cutter module 350 also comprises a movable blade 354 which can reciprocate back and forth in the cutter module 350. The movable blade 354 comprises a knife portion 356.

Image receiving tape can exit the cutter module via outlet 362. When inserted in the label printing apparatus 301 the outlet 362 of the cutter module is configured to correspond with outlet 340 of the label printer housing. Image receiving tape is cut by the action of the knife portion 356 of movable blade 354 moving past knife portion 360 of fixed blade 358.

Actuation of the movable blade 354 is effected by the actuator 328, as discussed in more detail below with respect to FIG. 6A. Connecting portion 364 of actuator 328 can slide in portion 366 to guide the movement of the actuator 328.

The actuator 328 is biased away from cutter module body 352 by biasing means 368. In this embodiment the biasing means 368 is a compression spring. When a user presses the actuator 328 in the direction of arrow A the spring 368 is compressed. When the user lets go of the actuator 328 the spring 368 decompresses and moves the actuator in the direction of arrow B back to its rest position as shown in FIG. 5. This also causes the movable blade to return to its rest position shown in FIG. 5.

Figure 6:
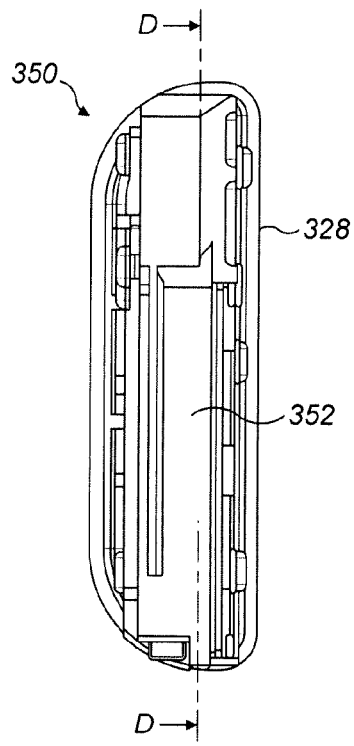
FIG. 6 is an end-view of the cutter module of FIG. 5.

FIG. 6 is an end on view of the cutter module 350 taken in the direction of arrow X of FIG. 5.

In this Figure the outer profile of the actuator 328 is visible. The main body 352 of the cutter module fits within the outer profile of the actuator 328. In other words the cutter module 350 fits within the "footprint" of the actuator 328.

Figure 6A:
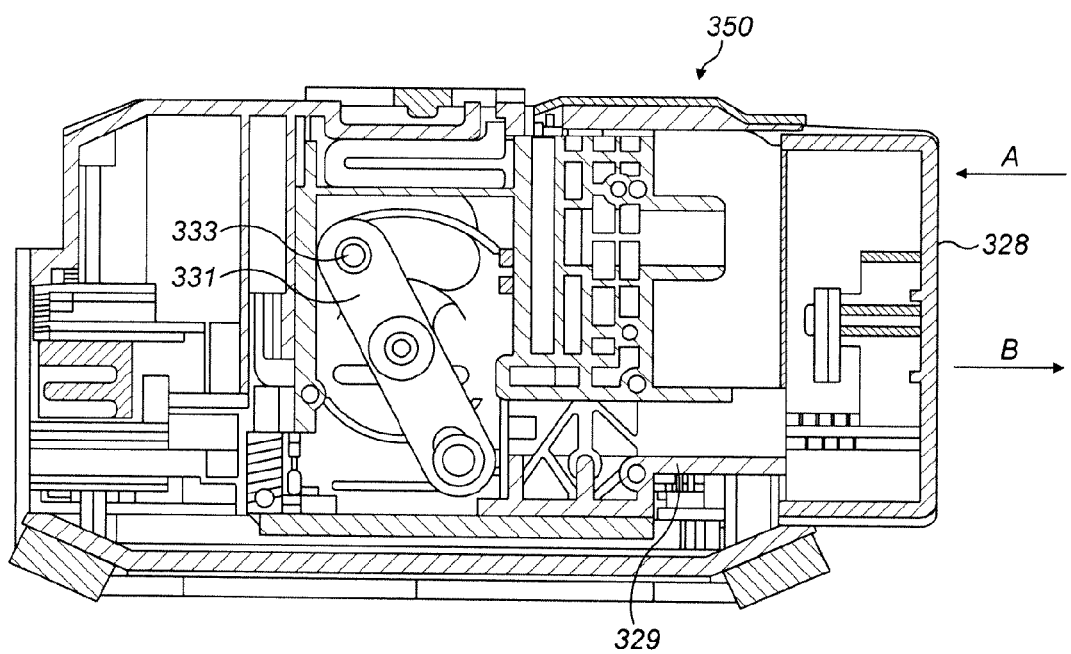
FIG. 6A is a cross-section of the cutter module of FIGS. 5 and 6.

FIG. 6A is a sectional view of the cutter module 350 in the direction of arrow D-D of FIG. 6. Movement in the direction of arrow A of actuator 328 causes a corresponding movement in the direction of arrow A of region 329. This in turn pushes the lever arm 331 to rotate clockwise when viewing FIG. 6A. Lever arm 331 is attached to the movable blade 354 by pin 333. Pin 333 is received within bearing 335 which projects through an aperture 337 in the movable blade 334 (see FIG. 5). Accordingly movement in direction A of actuator 328 causes a corresponding movement in direction A of portion 329, which in turn rotates lever arm 329 clockwise (when viewing FIG. 6A) which in turn causes movement of the movable blade 354 in the direction of arrow B. This moves the movable blade 354 into contact with the fixed blade 358 so as to cut any image receiving tape present in the outlet 340. When the force is removed from the actuator 328 the spring 368 decompresses to return the actuator 328 and the movable blade 354 to the rest position shown in FIG. 5 and FIG. 6A.

In other words movement of the actuator in a first direction causes movement of the movable blade 354 in a second direction, the first direction being opposite to the second direction.

Figures 7, 8:
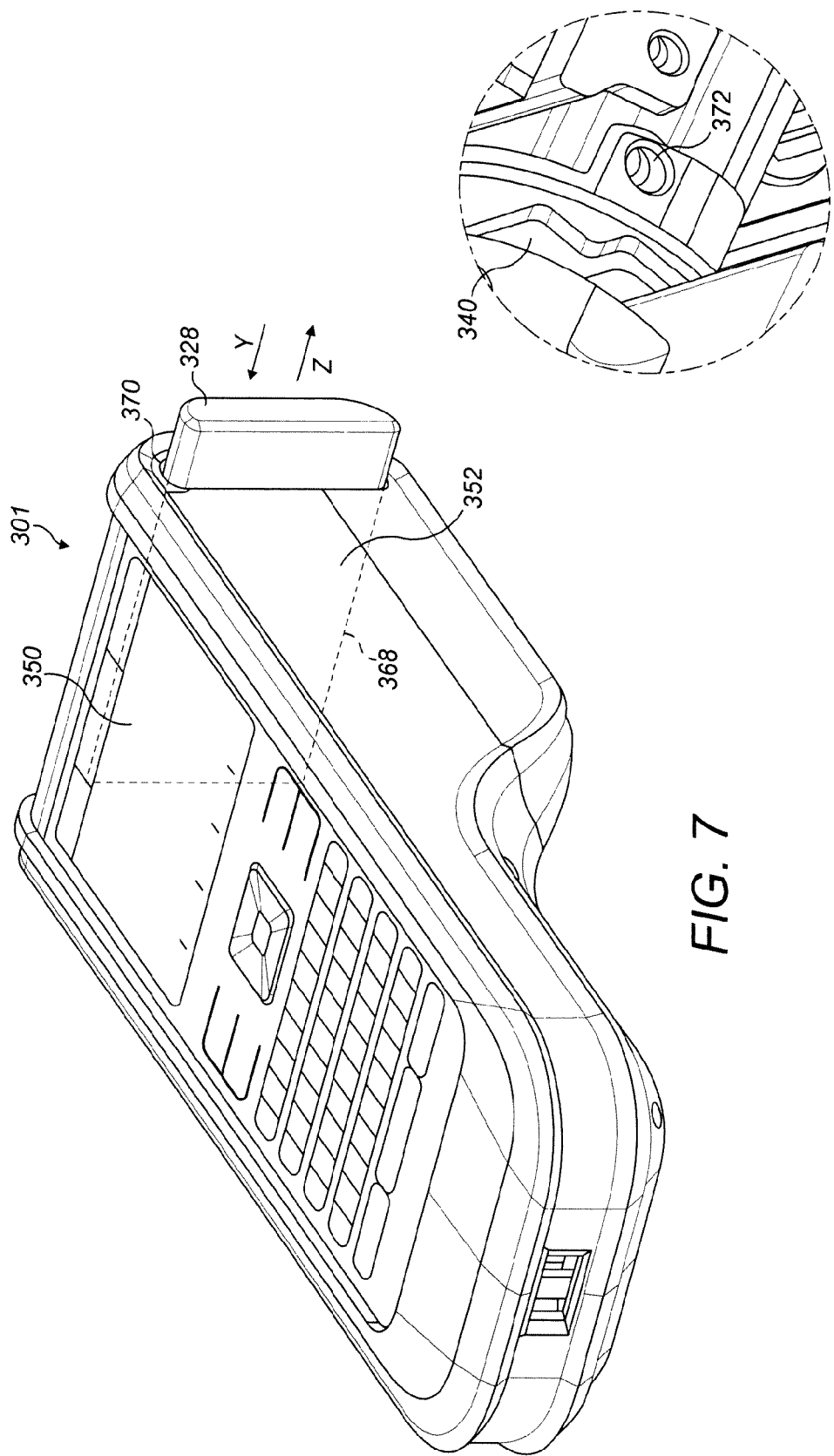
FIG. 7 is a perspective view of the label printer, schematically showing the position of the cutter module.
FIG. 8 is an enlarged view of Detail C of FIG. 4.

FIG. 7 is an isometric view of the label printer 301, similar to FIG. 3. In this Figure the main body 352 of the cutter module 350 is represented by the dashed line 368. This schematically illustrates the location of the cutter module within the label printer 301. The cutter module 350 can be inserted into the label printer 301 via aperture 370. Aperture 370 is also visible in FIG. 4.

The cutter module 350 can be inserted into the label printer 301 via aperture 370 in the direction of arrow Y. The cutter module 350 can be removed from the label printer 301 via aperture 370 in the direction of arrow Z.

As shown in FIG. 7, when located in the label printer 301 the actuator or cutter button 328 projects outwardly of the housing of the label printer. The user actuates the actuator 328 by pushing it in the direction of arrow Y. As explained above this causes movement of the movable blade 354 to effect a cutting operation.

The cutter module 350 may be fixed within the label printer 301 in any known way. For example this could be a push fit or a snap fit. In the case of a snap fit the cutter module 350 is provided with a locking feature to locate in a corresponding locking feature of the label printer 301.

FIG. 8 shows detail C of FIG. 4. This Figure shows outlet 340 through which printed image receiving tape exits the label printer 301. Also shown is a hole 372 which comprises an unlocking mechanism for unlocking the cutter module from the label printer 301. In one embodiment the hole 372 can receive a projection of the cutter module which snap fits into the hole 372. To release the cutter module 350 the user can then depress the snap fit projection in the hole 372 using a suitable tool, thus unlocking the cutter module so that it can be removed from the label printer 301. As previously described, the cutter module 350 can be removed from the label printer 301 in the direction of arrow Z (see FIG. 7). The direction of insertion and removal of the cutter module 350 into and out of the label printer 301 is in a direction substantially perpendicular to the axes of rotation of the drive spools 332 and 334.

Embodiments of the present invention facilitate insertion and removal of the cutter module into and out of the label printer 301 whilst enabling a compact design of label printer 301 to be maintained. By using the aperture 370 for the dual function of receiving the actuator 328 and the cutter module 350, this may obviate the requirement for a separate cover for access to the cutting mechanism. In some embodiments the cutter mechanism may be provided in the form of a unitary module. This makes it easy to insert and remove the cutter mechanism from the printer. Accordingly the entire module can be removed from the label printer 301 such that the blades of the cutter module can be cleaned or replaced. For example adhesive from the image receiving tape may build up on the movable blade 354 and/or the fixed blade 358, which may need to be removed. Alternatively, if the life span of the cutter module 350 has been reached then it can simply be replaced with an entirely new cutter module. Maintenance and/or replacement of the cutter module 350 can therefore be carried out by a user without the need for any specialist knowledge or tools.

The invention claimed is:

1. A printing apparatus comprising:
a housing;
a printing mechanism;
a receiving bay for receiving a supply of image receiving medium; and
a cutter module removably attached in said housing for cutting said image receiving medium, said cutter module comprising a movable blade and an actuator for actuating said movable blade;
wherein said housing comprises an aperture, said cutter module being at least partially received in said aperture and being removable via said aperture, said actuator comprises a cutter button which projects outwardly from said aperture when in a rest position, and said housing comprises a locking mechanism for locking said cutter module in said printing apparatus.

2. A printing apparatus as set forth in claim 1, wherein said cutter module is slidably receivable in said housing via said aperture.

3. A printing apparatus as set forth in claim 1, wherein said cutter module comprises at least one fixed blade.

4. A printing apparatus as set forth in claim 1, wherein said locking mechanism comprises a release mechanism for unlocking said cutter module from said housing.

5. A printing apparatus as set forth in claim 4, wherein said release mechanism is accessible via a cover of said printing apparatus.

6. A printing apparatus as set forth in claim 5, wherein said release mechanism is comprised in said printer housing.

7. A printing apparatus as set forth in claim 6, wherein said release mechanism is accessed by opening said cover of said printing apparatus.

8. A printing apparatus comprising:
a housing;
a printing mechanism;
a receiving bay for receiving a supply of image receiving medium; and
a cutter module removably attached in said housing for cutting said image receiving medium, said cutter module comprising a movable blade and an actuator for actuating said movable blade;
wherein said housing comprises an aperture, said cutter module being at least partially received in said aperture and being removable via said aperture, said actuator comprises a cutter button which projects outwardly from said aperture when in a rest position, and said cutter module is a snap-fit in said printing apparatus.

9. A printing apparatus as set forth in claim 8, wherein said cutter module is slidably receivable in said housing via said aperture.

10. A printing apparatus as set forth in claim 8, wherein said cutter module comprises at least one fixed blade.

11. A printing apparatus comprising:
a housing;
a printing mechanism;
a receiving bay for receiving a supply of image receiving medium; and
a cutter module removably attached in said housing for cutting said image receiving medium, said cutter module comprising a movable blade and an actuator for actuating said movable blade;
wherein said housing comprises an aperture, said cutter module being at least partially received in said aperture and being removable via said aperture, said actuator comprises a cutter button which projects outwardly from said aperture when in a rest position, said receiving bay comprises a drive spool for driving said image receiving medium, and said cutter module is removable from said aperture in a direction perpendicular to an axis of rotation of said drive spool.

12. A printing apparatus as set forth in claim 11, wherein said cutter module is slidably receivable in said housing via said aperture.

13. A printing apparatus as set forth in claim 11, wherein said cutter module comprises at least one fixed blade.

14. A printing apparatus comprising:
a housing;
a printing mechanism;
a receiving bay for receiving a supply of image receiving medium; and
a cutter module removably attached in said housing for cutting said image receiving medium, said cutter module comprising a movable blade and an actuator for actuating said movable blade;
wherein said housing comprises an aperture, said cutter module being at least partially received in said aperture and being removable via said aperture, said actuator comprises a cutter button which projects outwardly from said aperture when in a rest position, said actuator has a cross-sectional area, and the other components of the cutter module define an outer profile which can be accommodated within said cross-sectional area.

15. A printing apparatus as set forth in claim 14, wherein said cross-sectional area is in a plane that is perpendicular to a direction in which the actuator is configured to be actuated.

16. A printing apparatus as set forth in claim 14, wherein said cutter module is slidably receivable in said housing via said aperture.

17. A printing apparatus as set forth in claim 14, wherein said cutter module comprises at least one fixed blade.

18. A cutter module for a label printing apparatus comprising:
- a body portion;
- a fixed blade;
- a movable blade; and
- an actuator;
- wherein said actuator is connected to said movable blade with a linkage arrangement, and wherein movement of said actuator in a first direction causes a corresponding movement of the movable blade in a second direction, said second direction being opposite to said first direction.

19. A cutter module as set forth in claim 18, wherein said linkage arrangement comprises a lever arranged to rotate about a pivot point.

20. A cutter module as set forth in claim 18, wherein actuation of said actuator drives said movable blade towards said actuator.

21. A cutter module as set forth in claim 18, wherein said actuator is biased away from said movable blade.

22. A printing device comprising a cutter module as set forth in claim 18.

23. A printing apparatus comprising:
- a housing;
- a printing mechanism;
- a receiving bay for receiving a supply of image receiving medium; and
- a cutter module removably attached in said housing for cutting said image receiving medium, said cutter module comprising a body portion, a fixed blade, a movable blade, and an actuator for actuating said movable blade;
- wherein said housing comprises an aperture, said cutter module being at least partially received in said aperture, and being removable via said aperture; and
- wherein said actuator has a cross-sectional area, and wherein the body portion, the fixed blade and the movable blade define an outer profile which can be accommodated within said cross-sectional area.

\* \* \* \* \*